United States Patent Office

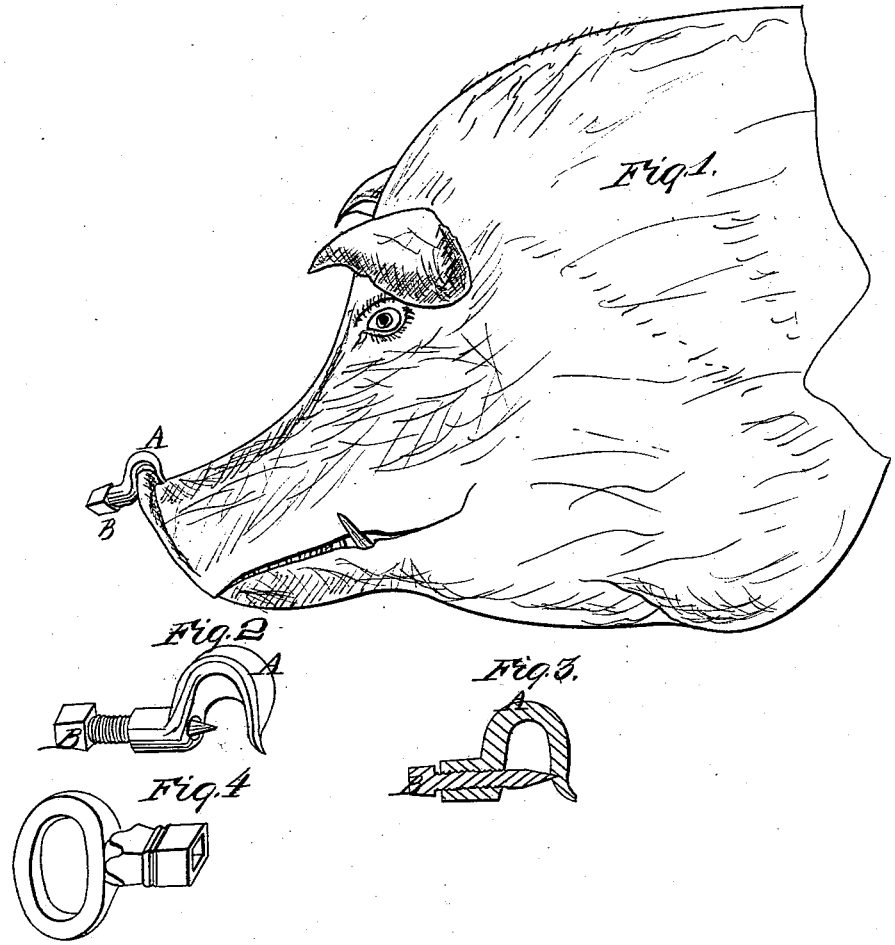

M. G. TOUSLEY AND F. E. MARCELLUS, OF FULTON, ILLINOIS.

Letters Patent No. 64,461, dated May 7, 1867.

NOSE JEWEL FOR SWINE.

*The Schedule referred to in these Letters Patent and making part of the same.*

TO ALL WHOM IT MAY CONCERN:

Be it known that M. G. TOUSLEY and F. E. MARCELLUS, both of Fulton, in county of Whiteside, and State of Illinois, have invented a new and useful Implement to be Attached to the Noses of Swine to Prevent them from Rooting, which can be removed at pleasure; and we do hereby declare that the following is a full and exact description thereof, reference being had to the accompanying drawings, and to the letters of reference marked thereon, making a part of this specification, in which—

Figure 1 is a view of the jewel or implement attached to the nose.

Figure 2 is a perspective view showing the device ready to be applied.

Figure 3, longitudinal section.

Figure 4, view of key to operate the bolt B.

A is the clevis or clog. B is the bolt with sharp point, and made to screw into the clog A, as shown.

Now, to enable others to make and use our invention, we will describe its construction and operation.

We make the clevis or clog A of any suitable material, and fit to it the bolt or pin B, which works in the clevis, by means of a screw, and is operated by a key or wrench.

Now, to apply the implement, the clog or clevis is placed on the snout of the swine, either end up, and by turning the bolt B, it is forced through the snout into the socket, as shown in fig. 3.

Now, to remove the implement, we have but to unscrew the bolt B, and the whole is removed, and no damage is done to the hog by cutting or injuring the snout.

What we claim as our invention, and desire to secure by Letters Patent, is—

The arrangement and construction of the device, when constructed, arranged, and operating substantially as and for the purposes above set forth.

M. G. TOUSLEY,
F. E. MARCELLUS.

Witnesses:
C. L. MARCELLUS,
C. S. THACHER.